United States Patent
Gill (10) Patent No.: US 8,156,068 B2
(45) Date of Patent: Apr. 10, 2012

(54) PREDICTIVE EPHEMERAL POINTS-OF-INTEREST (PEPOI)

(75) Inventor: Regan Gill, Berkeley, CA (US)

(73) Assignee: TeleCommunication Systems, Inc., Annapolis, MD (US)

(*) Notice: Subject to any disclaimer, the term of this patent is extended or adjusted under 35 U.S.C. 154(b) by 675 days.

(21) Appl. No.: 12/292,205

(22) Filed: Nov. 13, 2008

(65) Prior Publication Data
US 2010/0121803 A1    May 13, 2010

(51) Int. Cl.
G06F 17/00    (2006.01)
G06N 5/02    (2006.01)

(52) U.S. Cl. .......................................................... 706/48

(58) Field of Classification Search .................... 706/11, 706/48; 701/209
See application file for complete search history.

(56) References Cited

U.S. PATENT DOCUMENTS

| | | | |
|---|---|---|---|
| 6,470,189 B1 | 10/2002 | Hill et al. | |
| 6,820,092 B2 | 11/2004 | Nakano | |
| 7,093,286 B1 | 8/2006 | King | |
| 7,379,729 B2 | 5/2008 | Holland | |
| 7,627,656 B1 | 12/2009 | Anand et al. | 709/220 |
| 2001/0038626 A1 | 11/2001 | Dynarski | |
| 2002/0042819 A1 | 4/2002 | Reichert | |
| 2002/0082774 A1 | 6/2002 | Bloebaum | |
| 2003/0050075 A1* | 3/2003 | Rangarajan et al. | 455/456 |
| 2003/0055555 A1 | 3/2003 | Knockheart | |
| 2003/0182052 A1 | 9/2003 | DeLorme | |
| 2004/0003125 A1 | 1/2004 | Ichimura | |
| 2004/0027258 A1 | 2/2004 | Pechatnikov | |
| 2004/0203603 A1 | 10/2004 | Pierce | |
| 2004/0203873 A1 | 10/2004 | Gray | 455/456.1 |
| 2004/0215641 A1 | 10/2004 | Kothuri | |
| 2004/0224702 A1 | 11/2004 | Chaskar | |
| 2005/0038876 A1* | 2/2005 | Chaudhuri | 709/219 |
| 2005/0148342 A1 | 7/2005 | Sylvain | |
| 2005/0188333 A1 | 8/2005 | Hunleth | |
| 2005/0251331 A1 | 11/2005 | Kreft | |
| 2006/0015513 A1 | 1/2006 | Poyhonen et al. | 707/100 |
| 2006/0055693 A1 | 3/2006 | Slythe | |
| 2006/0089792 A1 | 4/2006 | Manber et al. | |
| 2006/0116818 A1 | 6/2006 | Chao et al. | 701/211 |
| 2006/0155679 A1 | 7/2006 | Kothuri | |

(Continued)

OTHER PUBLICATIONS

Ahern et al., "World Explorer: Visualizing Aggregate Data from Unstructured Text in Geo-Referened Collections," Jun. 18-23, 2007, ACM, JCDL'07.

(Continued)

*Primary Examiner* — Jeffrey A Gaffin
*Assistant Examiner* — Benjamin Buss
(74) *Attorney, Agent, or Firm* — William H. Bollman (57) ABSTRACT

Predicted ephemeral Points of Interest (PEPOI) are provided to wireless application users, as are likelihood maps. Wireless application users are provided with the ability to record locations and retrieve maps of past locations and predicted future locations of PEPOIs of specific interest. To predict a location for a PEPOI, data about previous reported locations are gathered, along with variable values associated with variations in location. The variables gathered may differ based on the type of PEPOI in question. For instance, a person has different variables associated with its locations than does a storm cloud. Once there is enough data recorded to provide predictable patterns, desirable methods of statistical analysis are chosen depending of the behavior model of PEPOI, which can be used to present a visual guide to finding the PEPOIs at a particular time in the future.

9 Claims, 7 Drawing Sheets

U.S. PATENT DOCUMENTS

| | | | |
|---|---|---|---|
| 2006/0173841 A1* | 8/2006 | Bill ................................ 707/6 |
| 2006/0174209 A1 | 8/2006 | Barros |
| 2006/0200308 A1 | 9/2006 | Arutunian |
| 2006/0206586 A1 | 9/2006 | Ling |
| 2006/0223518 A1 | 10/2006 | Haney |
| 2006/0229802 A1 | 10/2006 | Vertelney et al. |
| 2007/0010942 A1* | 1/2007 | Bill ............................ 701/209 |
| 2007/0015518 A1 | 1/2007 | Winter |
| 2007/0036318 A1 | 2/2007 | Gits et al. .................. 379/202.01 |
| 2007/0153983 A1 | 7/2007 | Bloebaum |
| 2007/0174259 A1 | 7/2007 | Amjadi |
| 2007/0213043 A1 | 9/2007 | Son ............................. 455/422.1 |
| 2007/0219706 A1 | 9/2007 | Sheynblat |
| 2007/0219708 A1 | 9/2007 | Brasche |
| 2007/0233817 A1 | 10/2007 | Johnson et al. |
| 2007/0238472 A1 | 10/2007 | Wanless |
| 2007/0253642 A1 | 11/2007 | Berrill |
| 2007/0288613 A1 | 12/2007 | Sudame et al. ............... 709/223 |
| 2008/0112551 A1 | 5/2008 | Forbes et al. ............. 379/142.1 |
| 2008/0130597 A1 | 6/2008 | Kalhan ........................ 370/338 |
| 2008/0139114 A1 | 6/2008 | Ranganathan ............. 455/41.1 |
| 2008/0177462 A1 | 7/2008 | Yoshioka |
| 2008/0177839 A1 | 7/2008 | Chang |
| 2008/0261560 A1 | 10/2008 | Ruckart ........................ 455/411 |
| 2008/0268822 A1 | 10/2008 | Johnson |
| 2008/0270366 A1 | 10/2008 | Frank |
| 2008/0275637 A1 | 11/2008 | Kim |
| 2008/0307445 A1 | 12/2008 | Garg ............................. 719/328 |
| 2009/0055087 A1 | 2/2009 | Beacher |
| 2009/0100037 A1* | 4/2009 | Scheibe ........................... 707/5 |
| 2010/0113072 A1* | 5/2010 | Gibson et al. ................ 455/466 |
| 2010/0214117 A1* | 8/2010 | Hazzani .................. 340/825.49 |

OTHER PUBLICATIONS

Internal Search Report received in PCT/US2008/12621 dated Jan. 8, 2009.

Internal Search Report received in PCT/US2009/02016 dated May 27, 2009.

International Search Report in PCT/US2008/10543 dated Aug. 19, 2010.

International Search Report in PCT/US2008/10542 dated Aug. 19, 2010.

U.S. Appl. No. 11/251,766, filed Oct. 2005, Barcklay.

Statement by the inventor constituting inventor's knowledge of prior art material to the application for patent submitted herewith.

PCT International Search Report in PCT/US2009/05487 dated Nov. 17, 2009.

* cited by examiner

PREDICTIVE EPHEMERAL POINTS-OF-INTEREST (PEPOI)

BACKGROUND OF THE INVENTION

1. Field of the Invention

This invention relates generally to wireless telecommunications systems, and more particularly to wireless location and navigation.

2. Background of Related Art

Points of Interest, commonly abbreviated POIs, are a well known concept in Geographic systems. A Point of Interest is defined for purposes of this invention as an object associated with a latitude and longitude, for some period of time, the location of which at least one person would reasonably be expected to have an interest.

Figure 5:
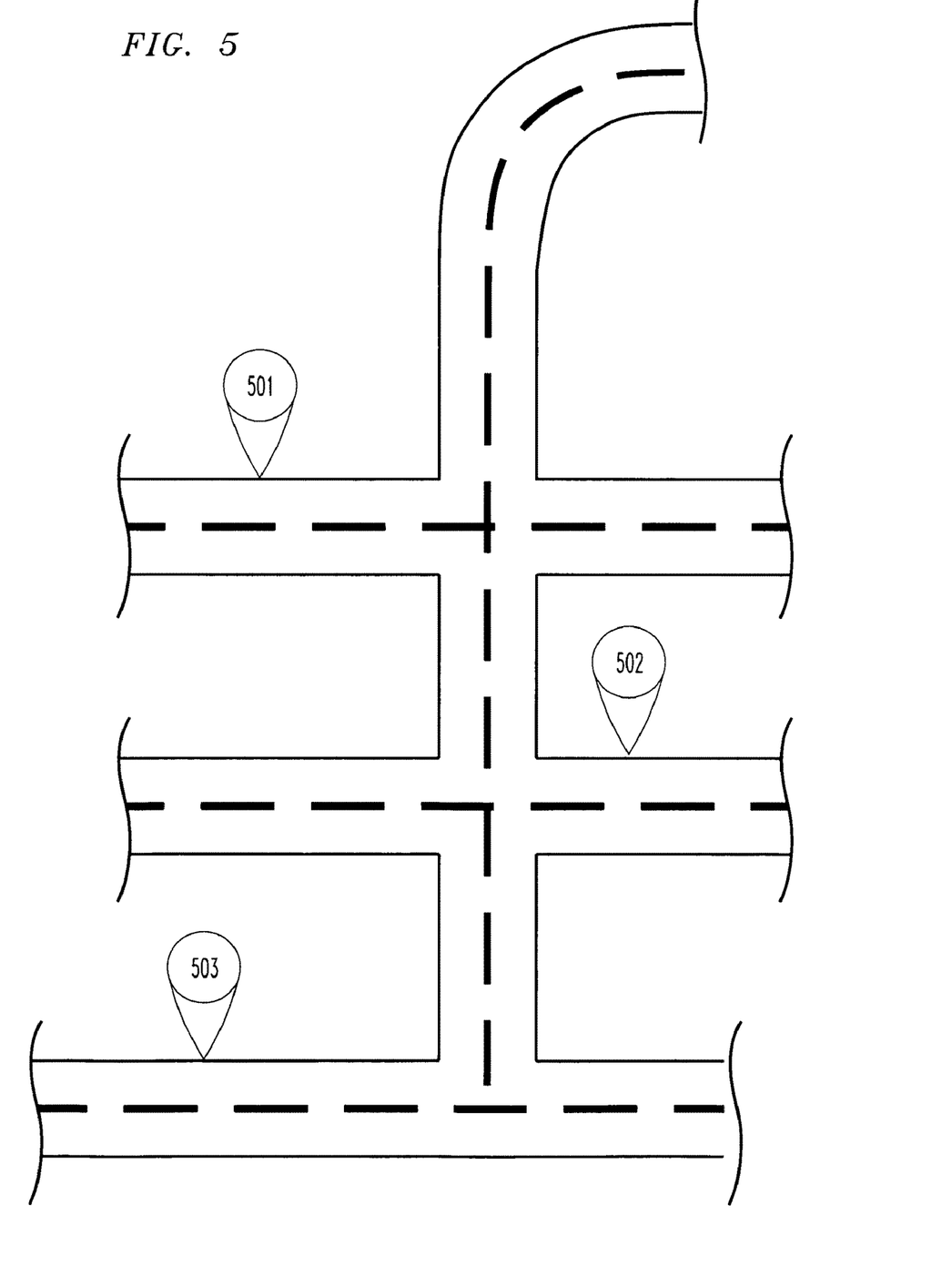
FIG. 5 shows conventional points-of-interest having fixed locations.

FIG. 5 shows conventional points-of-interest having fixed locations.

In particular, as shown in FIG. 5, several points-of-interest 501-503 depict the locations of a given type of point-of-interest, e.g., fast food restaurants.

Current location aware wireless applications provide the locations of many types of objects. This includes Point of Interest (POI) information for consumers including places of business, tourist destinations, government buildings and similar objects. In addition some applications provide locations of people of interest such as family members and friends. Business applications may provide the tracked locations of employees or their vehicles. Other types of information such as traffic and weather are provided in some applications. All of these applications provide the locations of objects from recorded and stored latitude and longitudes.

However, as the inventor herein has recognized, conventional "Finder" type wireless applications provide locations for objects corresponding to recorded locations. For instance, existing products like mobile navigation applications (e.g., TCS Navigator™ commercially available from TeleCommunication Systems, Inc. of Annapolis, Md., US) and web based products such as Google™ Maps use of points of interest (POIs) based on fixed records of locations only. Using conventional technologies, many movable objects that can be considered Points of Interest can not be pinpointed to a specific fixed location at the time a particular location information request is initiated, nor can the location be provided for a future time span. Conventional technologies have the capability to provide only a static location pre-registered or otherwise pre-stored in a suitable database in response to a location information request.

SUMMARY OF THE INVENTION

In accordance with the principles of the present invention, an apparatus to provide a predictive ephemeral point-of-interest (PEPOI) comprises a predictive model application module to apply a predictive point-of-interest model to at least one previously recorded location at a given time for a given type of point-of-interest. A module inputs a given time associated with a received request for a predictive ephemeral point-of-interest (PEPOI) to the predictive point-of-interest model, to generate a predictive ephemeral point-of-interest.

A method of providing a predictive ephemeral point-of-interest (PEPOI) in accordance with another aspect of the invention comprises receiving a request for a predictive ephemeral point-of-interest (PEPOI) for a given type of point-of-interest. An appropriate model to be used to generate said PEPOI is selected. A time associated with the PEPOI is applied to the predictive ephemeral point-of-interest. A predictive ephemeral point-of-interest is generated from the predictive ephemeral point-of-interest having the time applied.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Conventional points-of-interest (POI) applications do not provide location information for objects without a recorded location. For example if customers are interested in finding a rare wild bird that has been sighted in an area, use of an otherwise conventional points-of-interest application might be able to provide a past location of a sighting. However, conventional POI applications cannot tell the customers where the rare wild bird is now, and especially not where it will likely be tomorrow at 9 AM.

The present inventor has appreciated that many objects have characteristics such that the location of the object at a time in the future may be predicted. In a wireless network, as appreciated by the inventor herein, provision of a predicted location to customers opens up a wide range of applications that are not possible with conventional POI applications that operate using only fixed and definite locations data.

The present invention provides a system of providing Predicted Ephemeral Points of Interest (PEPOI), and of providing likelihood maps to wireless application users. In particular, it provides a method of providing wireless application users the ability to record locations, to retrieve maps of past locations, as well as to obtain predicted future locations of predicted ephemeral points-of-interest (PEPOIs) of specific interest.

Points-Of-Interest (POI) objects can be thought of as persistent or ephemeral. Examples of persistent objects are buildings, for example a government office, a local business, or a house, as well as landmarks, geographical features, and other objects that maintain a consistent position over a long period of time. Ephemeral points of interest are objects that are not expected to be permanent; rather they may stay at a location for any period of time from a second to a year or more, but in any event are not expected to be permanent. They can be animate or inanimate.

Examples of ephemeral POIs are a traffic incident, a person, an animal, a planet, a weather prediction, a temperature, or a party. All ephemeral POIs share the property of existing at a point at a definable time, and are reasonably expected to be of interest to at least one individual.

Figure 1:
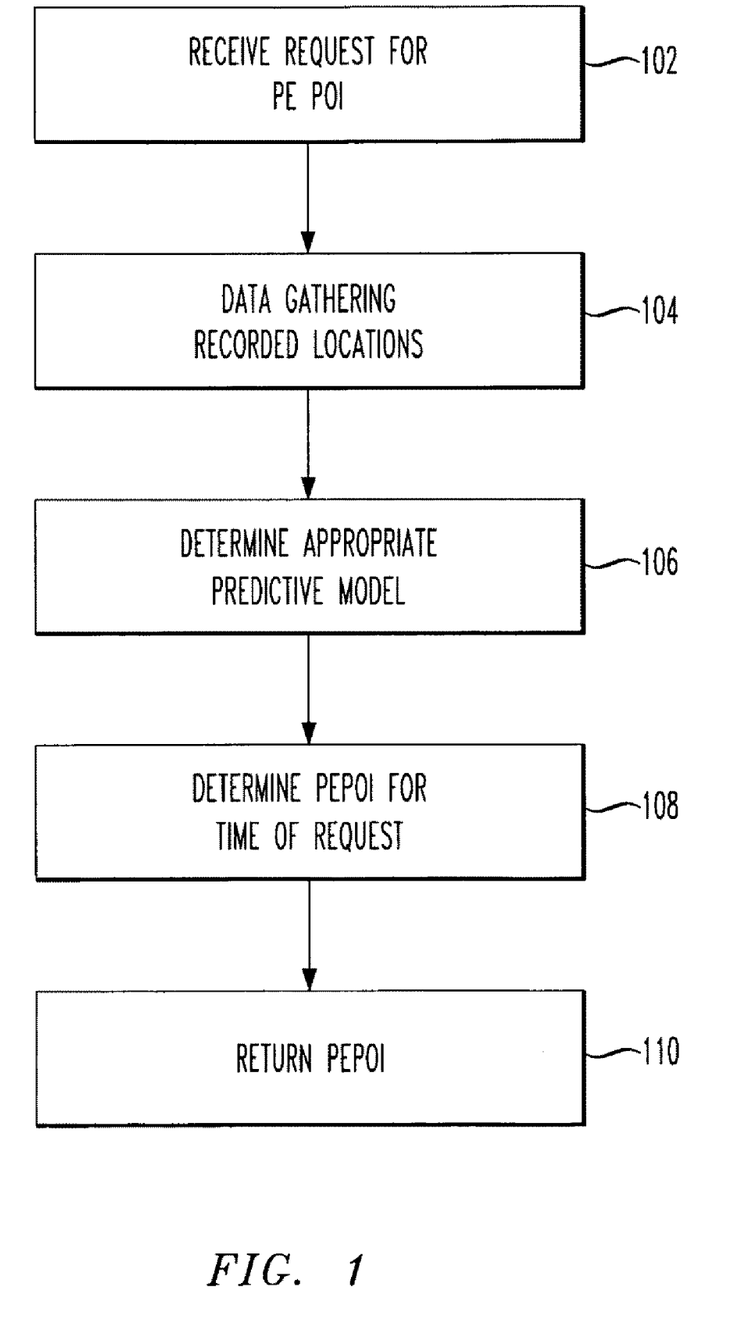
FIG. 1 shows a process for providing a predictive ephemeral point-of-interest, in accordance with the principles of the present invention.

FIG. 1 shows a process for providing a predictive ephemeral point-of-interest, in accordance with the principles of the present invention.

In particular, as shown in step 102 of FIG. 1, a request for a predictive ephemeral point-of-interest (PEPOI) is received, e.g., from a wireless device. The request for PEPOI may be received over a suitable network, e.g., a wireless phone network such as a Voice Over Internet Protocol (VoIP), GSM or CDMA network as depicted in the disclosed embodiments.

In step 104, data relating to previously recorded locations of a given point-of-interest type are gathered. The data may be stored in a suitable database, and may be associated at various levels of definition. For instance, a given location data reference point may relate to a bird for general points-of-interest requests relating to birds. The same data reference point may be used as a reference point for, e.g., a bald eagle, for more specific points-of-interest requests.

In step 106, an appropriate predictive model is determined for a given type of points-of-interest request. The predictive model may be selected before receipt of a request for predictive ephemeral point-of-interest (PEPOI).

In step 108, a predictive ephemeral point-of-interest (PEPOI) is determined for a given type point-of-interest, at the time that a given request for PEPOI is received. The time is preferably that which is time-stamped into the request for PEPOI itself, but may alternatively be a time of day that the PEPOI is actually being determined.

In step 110, the requested predictive ephemeral point-of-interest (PEPOI) is returned to the requester or other designated point.

In accordance with the principles of the present invention, predicted ephemeral Points of Interest (PEPOI) may be provided to wireless application users, as are likelihood maps. Thus, wireless application users are provided with the ability to record locations and retrieve maps of past locations and predicted future locations of PEPOIs of specific interest.

In accordance with the principles of the present invention, to predict a location for a PEPOI, data about previous reported locations are gathered, along with appropriate variable values associated with variations in location. The variables gathered may differ based on the type of PEPOI in question. For instance, a person would have different variables associated with its locations than would a storm cloud.

The present invention has particular application to, e.g., predicting the location of dynamic points-of-interest (POIs). One use case presented is a birder application, though the present invention has many more applications. Many bird watchers ("birders") have life lists of species and travel long distances to see species to add to their 'watched' list. If a rare bird is sighted somewhere, the present invention can use the recorded sightings to provide a map with the predicted locations where the sighted bird can be found at given requested time.

While the embodiments relate to the use of the time of a request for a predicted ephemeral point-of-interest (PEPOI) to generate a predicted ephemeral point-of-interest, a future time may be utilized to give a user a future location of a requested point-of-interest (POI) at a given time in the future.

Figure 2:
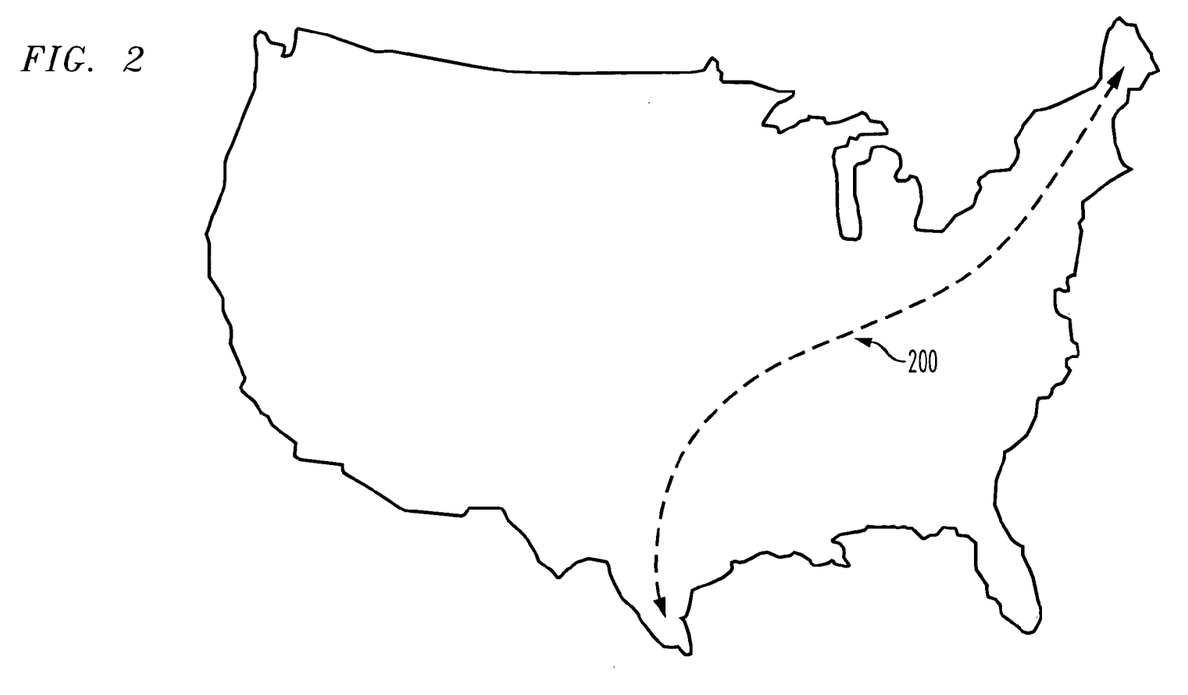
FIG. 2 shows an exemplary predictive model of movement of a given point-of-interest, e.g., a migration pattern of a butterfly.

FIG. 2 shows an exemplary predictive model of movement of a given point-of-interest, e.g., a migration pattern of a butterfly.

In particular, as shown in FIG. 2, a predictive model 200 is shown superimposed over a stretch of land (e.g., the United States). The predictive model 200 may be based on historical locations of butterflies at given times of the year.

Figure 3:
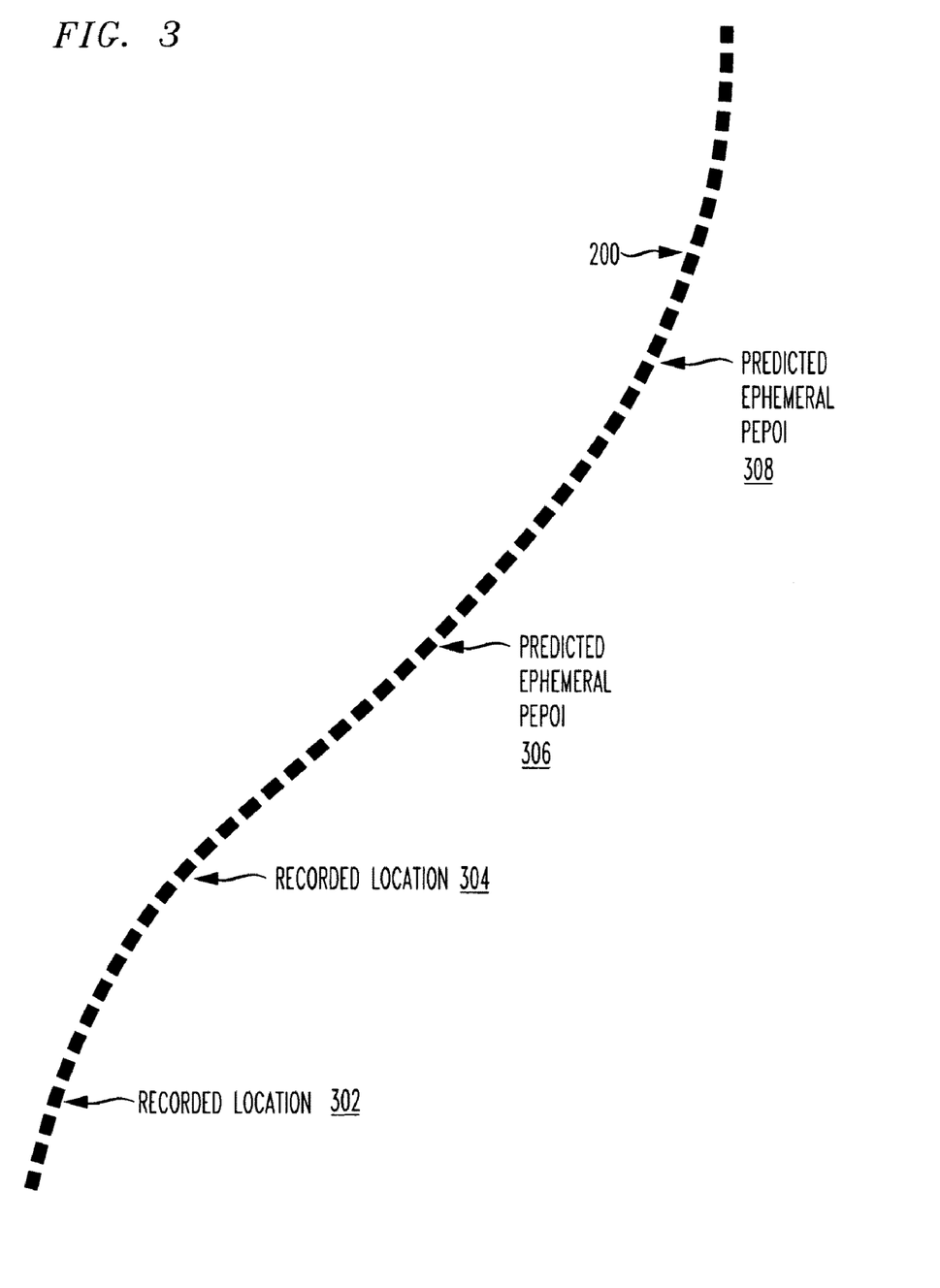
FIG. 3 depicts use of data (e.g., previously recorded positions) of a given point-of-interest, and application of the same to a predictive model (e.g., a migration pattern of a butterfly), in accordance with the principles of the present invention.

FIG. 3 depicts use of data (e.g., previously recorded positions) of a given point-of-interest, and application of the same to a predictive model (e.g., a migration pattern of a butterfly), in accordance with the principles of the present invention.

In particular, FIG. 3 shows the predictive model 200 as determined by a plurality of previously recorded locations 302, 304 together with the time that they relate to. Based on this exemplary predictive model 200, requests for predictive ephemeral points-of-interest 306, 308 at times in the future may be predicted by an appropriate predictive model application module 402 (FIG. 4).

Figure 4:
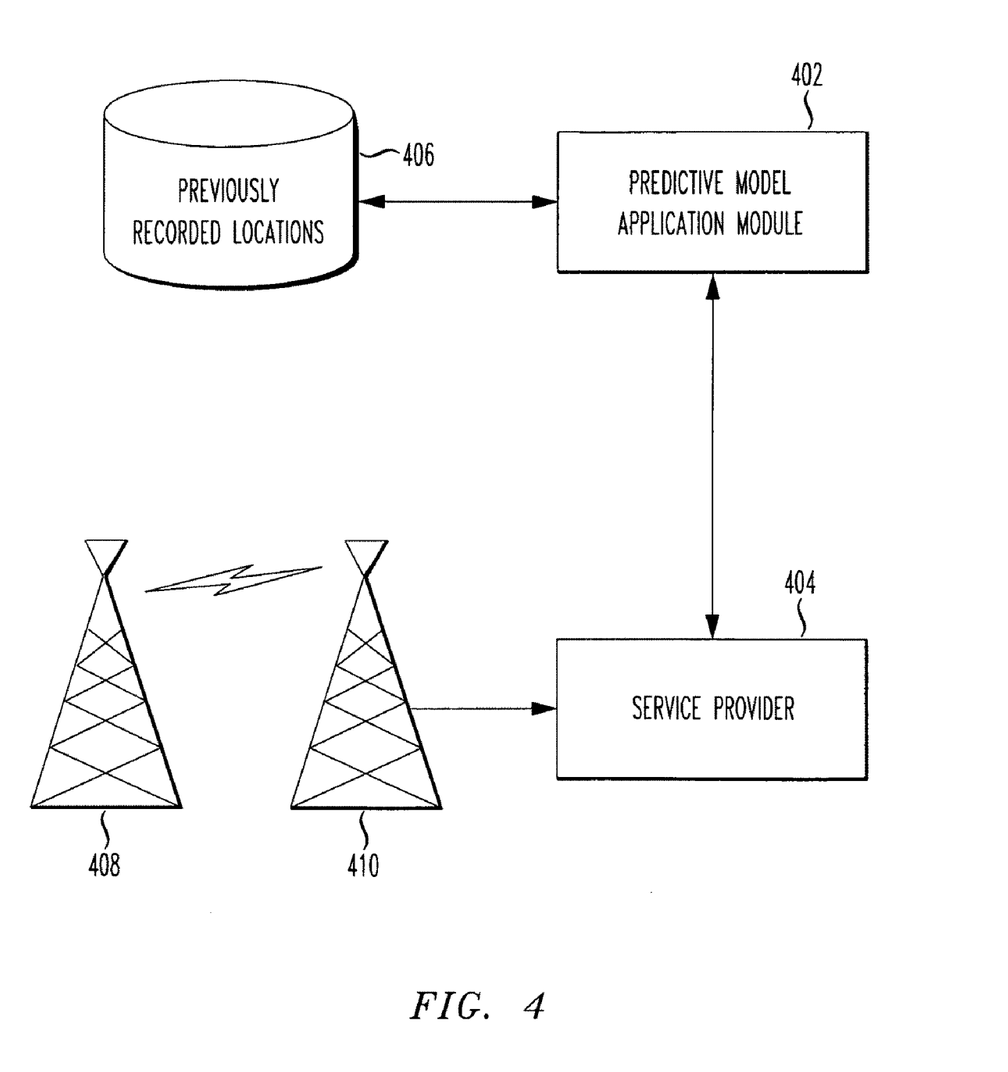
FIG. 4 depicts use of a predictive model application module having access to previously recorded locations of a given point-of-interest type, and return of a predictive ephemeral point-of-interest (PEPOI) in response to a request for the same, in accordance with the principles of the present invention.

FIG. 4 depicts use of a predictive model application module having access to previously recorded locations of a given point-of-interest type, and return of a predictive ephemeral point-of-interest (PEPOI) in response to a request for the same, in accordance with the principles of the present invention.

In particular, as shown in FIG. 4, the predictive model application module 402 may receive a request for a predictive ephemeral point-of-interest (PEPOI) from a wireless device 408 via a base station 410 and service provider 404. The predictive model application module 402 may have prestored therein predictive models for expected or supported point-of-interest types, though the predictive models may just as easily be stored in a suitable database 406.

Once there is sufficient enough data recorded to provide a predictable pattern, a suitable method of statistical analysis is chosen depending of the behavior model of the PEPOI, which is used to present a visual guide to finding the likely location of a given PEPOI at a particular time in the future.

For instance, an application can provide users with an interface to find other people that have particular characteristics. This requires two interfaces. The first interface provides users with a way of reporting the locations of individuals of the group of interest, and the second interface provides an interface for showing the likelihood of finding members of the group at some later time.

As an example, a user interested in finding birds would request locations of a particular species through the application. The application will request from the database previously stored information about locations at which this species has been observed previously. Based on the particular parameters relevant for this type of PEPOI (for instance: time of day, season of year, and local temperature and weather conditions), combined with recent reports and past location patterns, a area of predicted location can be determined. This is then shown to the user via a map with indicators of likely locations. These locations can be shown in a variety of ways, e.g., a pattern of dots or a cloud, or gradients of color or a combination of these are all ways of indicating likely locations to an application user.

Figure 6:
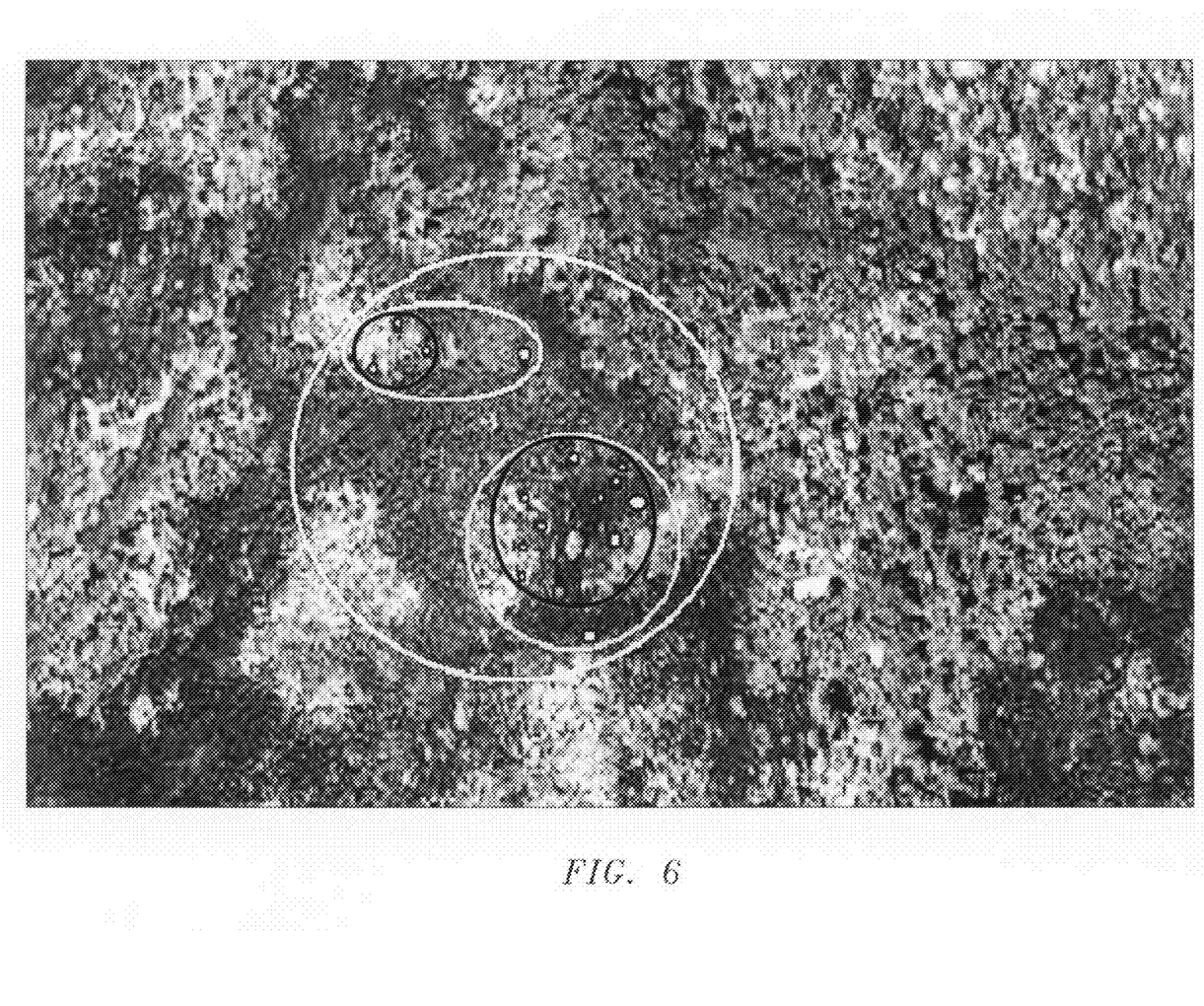
FIG. 6 shows a social application implementing predictive ephemeral points-of-interest (PEPOI), in accordance with the principles of the present invention.

FIG. 6 shows a social application implementing predictive ephemeral points-of-interest (PEPOI), in accordance with the principles of the present invention.

In particular, as shown in the exemplary social application of FIG. 6, a traveler in a town over the weekend is interested in finding a dart tournament. The application can show him locations that are likely to have a tournament on a Friday night because it has data collected in the past. The map can indicate varying degrees of likelihood based on properties of the data.

Figure 7:
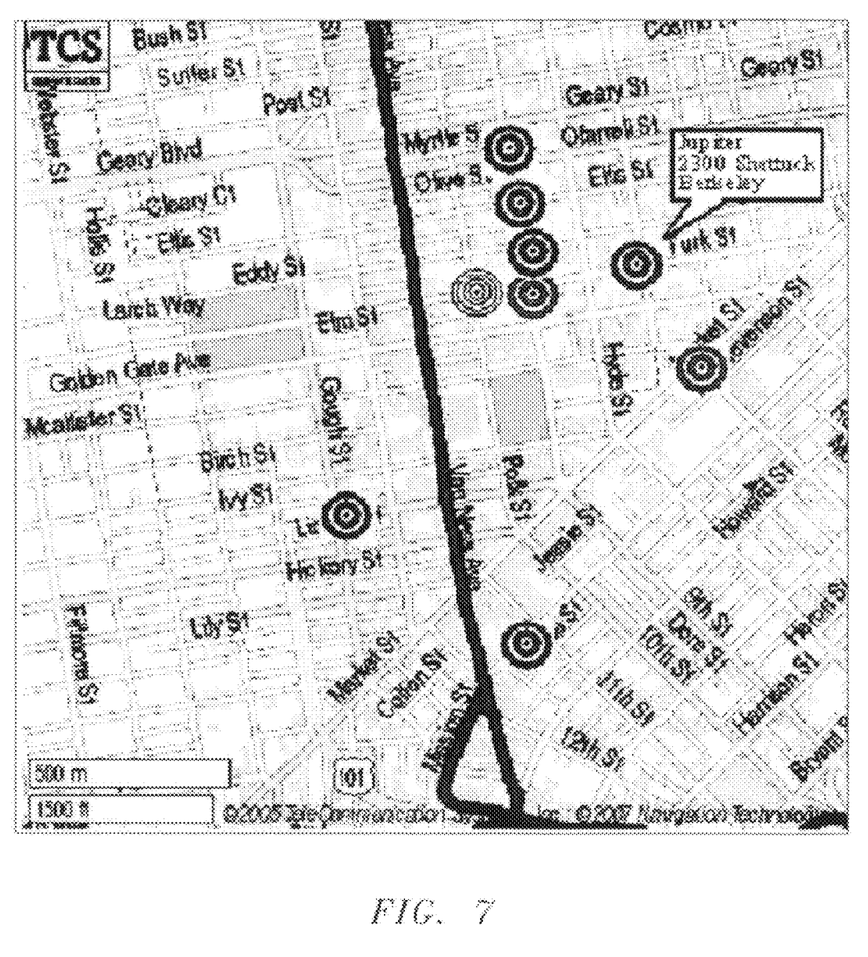
FIG. 7 shows a birdfinder application implementing predictive ephemeral points-of-interest (PEPOI), in accordance with the principles of the present invention.

FIG. 7 shows a birdfinder application implementing predictive ephemeral points-of-interest (PEPOI), in accordance with the principles of the present invention.

In particular, as shown in the exemplary birdfinder application of FIG. 7, the map indicates previous sightings in a part of a large park and the areas where the user may see the bird based on the previous sightings. The map can indicate various degrees of likelihood based on the time the user is interested in and properties of the previous data collected.

The present invention has particular applicability to consumer wireless location applications, e.g., any wireless application that shows possible locations generated through statistical analysis based on gathered previous locations of objects.

While the invention has been described with reference to the exemplary embodiments thereof, those skilled in the art will be able to make various modifications to the described embodiments of the invention without departing from the true spirit and scope of the invention.

What is claimed is:

1. An apparatus to provide a predictive ephemeral point-of-interest (PEPOI) to a requesting device, comprising:
    a physical receiver to receive, from a wireless device, a request for a predictive ephemeral point-of-interest (PEPOI) for a given type of point-of-interest; and
    a predictive model application module to select an appropriate predictive point-of-interest model to determine said PEPOI, to apply a given time to said selected predictive point-of-interest model, and to generate a predictive ephemeral point-of-interest with said selected predictive point-of-interest model.

2. The apparatus to provide a predictive ephemeral point-of-interest (PEPOI) to a requesting device according to claim 1, wherein:
    said wireless device is a voice over Internet protocol (VoIP) device.

3. A method of providing a predictive ephemeral point-of-interest (PEPOI) to a requesting device, comprising:
    receiving, via a physical receiver, a request from a wireless device for a predictive ephemeral point-of-interest (PEPOI) for a given type of point-of-interest;
    selecting an appropriate predictive point-of-interest model to be used to determine said PEPOI;
    inputting a given time associated with said received request for said PEPOI;
    applying said given time associated with said PEPOI to said selected predictive point-of-interest model; and
    generating a predictive ephemeral point-of-interest with said selected predictive point-of-interest model.

4. The method of providing a predictive ephemeral point-of-interest (PEPOI) to a requesting device according to claim 3, wherein said time associated with said PEPOI comprises:
    a time stamp extracted from said request.

5. The method of providing a predictive ephemeral point-of-interest (PEPOI) to a requesting device according to claim 3, wherein said time associated with said PEPOI comprises:
    a time of day associated with said given time of applying.

6. The method of providing a predictive ephemeral point-of-interest (PEPOI) to a requesting device according to claim 3, wherein said time associated with said PEPOI comprises:
    a future time.

7. An apparatus for providing a predictive ephemeral point-of-interest (PEPOI) to a requesting device, comprising:
    means for receiving, via a physical receiver, a request from a wireless device for a predictive ephemeral point-of-interest (PEPOI) for a given type of point-of-interest;
    means for selecting an appropriate model to be used to determine said PEPOI;
    means for inputting a given time associated with said received request for said PEPOI;
    means for applying said given time associated with said PEPOI to said selected predictive point-of-interest model; and
    means for generating a predictive ephemeral point-of-interest with said selected predictive point-of-interest model.

8. The apparatus for providing a predictive ephemeral point-of-interest (PEPOI) to a requesting device according to claim 7, wherein said time associated with said PEPOI comprises:
    a time stamp extracted from said request.

9. The apparatus for providing a predictive ephemeral point-of-interest (PEPOI) to a requesting device according to claim 7, wherein said time associated with said PEPOI comprises:
    a time of day associated with said given time of applying.

* * * * *